(12) United States Patent
Yoshimizu

(10) Patent No.: US 6,400,472 B1
(45) Date of Patent: Jun. 4, 2002

(54) IMAGE FORMING APPARATUS AND DOCUMENT READING DEVICE

(75) Inventor: Eiki Yoshimizu, Atsugi (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 09/350,099

(22) Filed: Jul. 9, 1999

Related U.S. Application Data

(62) Division of application No. 08/834,873, filed on Apr. 10, 1997, now Pat. No. 5,986,775.

(30) Foreign Application Priority Data

| Apr. 11, 1996 | (JP) | ................................ 8-89308 |
| Aug. 28, 1996 | (JP) | ............................ 8-225746 |
| Feb. 5, 1997 | (JP) | ................................ 9-22470 |

(51) Int. Cl.⁷ ................................ H04N 1/04
(52) U.S. Cl. ...................... 358/498; 358/496
(58) Field of Search ................................ 358/498, 408, 358/496, 474, 488; 399/367, 374

(56) References Cited

U.S. PATENT DOCUMENTS

| 4,743,974 A | * | 5/1988 | Lockwood .................. 358/498 |
| 5,513,017 A | * | 4/1996 | Knodt et al. ................ 358/471 |
| 5,956,161 A | * | 9/1999 | Takashimizu et al. ...... 358/496 |
| 5,986,775 A | * | 11/1999 | Yoshimizu .................. 358/496 |
| 5,995,801 A | * | 11/1999 | Katsuta et al. .............. 399/367 |
| 6,088,135 A | * | 7/2000 | Kusumoto ................... 358/498 |
| 6,151,478 A | * | 11/2000 | Katsuta et al. .............. 399/372 |

* cited by examiner

*Primary Examiner*—Cheukfan Lee
(74) *Attorney, Agent, or Firm*—Oblon, Spivak, McClelland, Maier & Neustadt, P.C.

(57) ABSTRACT

In accordance with the present invention, in an image forming apparatus, two document reading sections, a document conveying unit and a fixing unit are efficiently laid out so as to occupy a minimum of space available in the apparatus. Also, the document reading device is capable of reading even a relatively thick or a relatively long document conveyed by a turn-over type sheet-through document conveying device and not feasible for a turn-over path.

11 Claims, 5 Drawing Sheets

IMAGE FORMING APPARATUS AND DOCUMENT READING DEVICE

This application is a Divisional of application Ser. No. 08/834,873 filed Apr. 10, 1997, now U.S. Pat. No. 5,986,775.

BACKGROUND OF THE INVENTION

The present invention relates to a facsimile apparatus, copier or similar image forming apparatus including a reading section for reading a document in the form of a sheet with stationary optics while conveying the document. Also, the present invention relates to a document reading device applicable to, e.g., a facsimile apparatus or a copier for reading a document or sheet with stationary optics while conveying the document.

An image forming apparatus having an apparatus body and one or more system units connected thereto is conventional. The system units are commonly connectable to different types of image forming apparatuses and there by promote cost saving. It is therefore preferable with an image forming apparatus to simplify the functions of the apparatus body, so that sections which can be separated from the apparatus body can be implemented as system units.

It is a common practice with a facsimile apparatus or similar image forming apparatus including a reading section to mount an ADF (Automatic Document Feeder) in order to promote the efficient handling of a stack of documents. Basically, the ADF feeds one document from its tray or stacking section to a transport path while separating it from the underlying documents. The transport path extends linearly from the document feed side to a document discharge side. A contact line image sensor or similar stationary optics is located at a preselected position on the transport path, and reads the document being conveyed along the transport path. A relatively thick document not feasible for the above separation and feed mechanism is directly inserted to the reading section by hand, and then automatically conveyed. The linear transport path, however, has a substantial length and renders the entire apparatus bulky. To save space, there has been proposed and put to practical use a turn-over type sheet-through ADF capable of discharging a document read by stationary optics in the direction of sheet feed, as taught in Japanese Patent Publication No. 63-40514 by way of example. This kind of ADF has a document separating and feeding section for feeding one document while separating it from the others, a generally U-shaped turn-over path, and a transport path having a reading position assigned to stationary reading optics and for conveying the document turned over by the turn-over path.

Assume that an image forming apparatus has its document reading section, document conveying section along which a document fed from a stacking section is conveyed, and fixing unit for fixing a toner image on a sheet constructed into independent units, and that such units are individually connectable to the apparatus body. This brings about a drawback that the space available in the apparatus body cannot be efficiently used by the units, increasing the overall size of the apparatus body. Particularly, to read both sides of a document while conveying it only once, the document conveying unit must turn over the document and again feed it to the reading position, or two reading sections must be located at both sides of the transport path. This kind of arrangement increases the space to be allocated to the conveying unit or the spaces to be allocated to the reading units, making it difficult to miniaturize the apparatus.

The conventional turn-over type sheet-through ADF has the following problems. To switch the direction of document transport, the ADF usually includes a generally U-shaped turn-over path having an extremely small radius of curvature. Therefore, the turn-over path cannot deal with a relatively thick document or a relatively long document. Specifically, when a document is conveyed along the turn-over path, an extremely great conveying force is necessary (usually, the conveying force is substantially proportional to the width of a document and proportional to the square of the thickness of a document). Therefore, the turn-over path does not allow rollers to convey a broad and thick document therethrough alone. Further, a long document is apt to bring about a loop jam when conveyed through the turn-over path. It follows that the kind of documents which can be dealt with by the above ADF is limited.

SUMMARY OF THE INVENTION

It is therefore an object of the present invention to provide an image forming apparatus having two reading sections, a document conveying unit and a fixing unit efficiently laid out therein in order to reduce spaces to be allocated thereto, and a document reading device capable of conveying even a relatively thick document or a relatively long document to a reading position defined in a turn-over type sheet-through ADF.

In accordance with the present invention, an image forming apparatus includes a document conveying unit for conveying a document stacked on a stacking section thereof, and a fixing unit for fixing a toner image formed on a sheet, a reading section for reading an image of the document. A scanner support is constructed integrally with the fixing unit and supported by the body of the apparatus. A transport path is communicated to the document conveying unit and formed between a lower guide surface provided on the top of the scanner support and an upper guide surface provided on the bottom of the document conveying unit. A first reading section is mounted on the document conveying unit and has stationary optics facing the transport path; the stationary optics reads the front of the document being conveyed along the transport path. A second reading section is mounted on the scanner support and has stationary optics facing the transport path; the stationary optics reads the rear of the document being conveyed along the transport path. If desired, the reading optics of the first reading section and that of the second reading section may respectively read the rear and the front of the document.

Also, in accordance with the present invention, a document reading device includes a turn-over type sheet-through ADF including a document separating and feeding section for feeding a document while separating it from the other documents, a generally U-shaped turn-over path for turning over the document, and a transport path along which the document turned over by the turn-over path is conveyed. The transport path includes a reading position assigned to stationary optics. A manual feed unit forms an insertion path directly merging into the upstream side of the transport path following the turn-over path from the outside of the device.

BRIEF DESCRIPTION OF THE DRAWINGS

The above and other objects, features and advantages of the present invention will become apparent from the following detailed description taken with the accompanying drawings in which.

DESCRIPTION OF THE PREFERRED EMBODIMENTS

Figure 1:
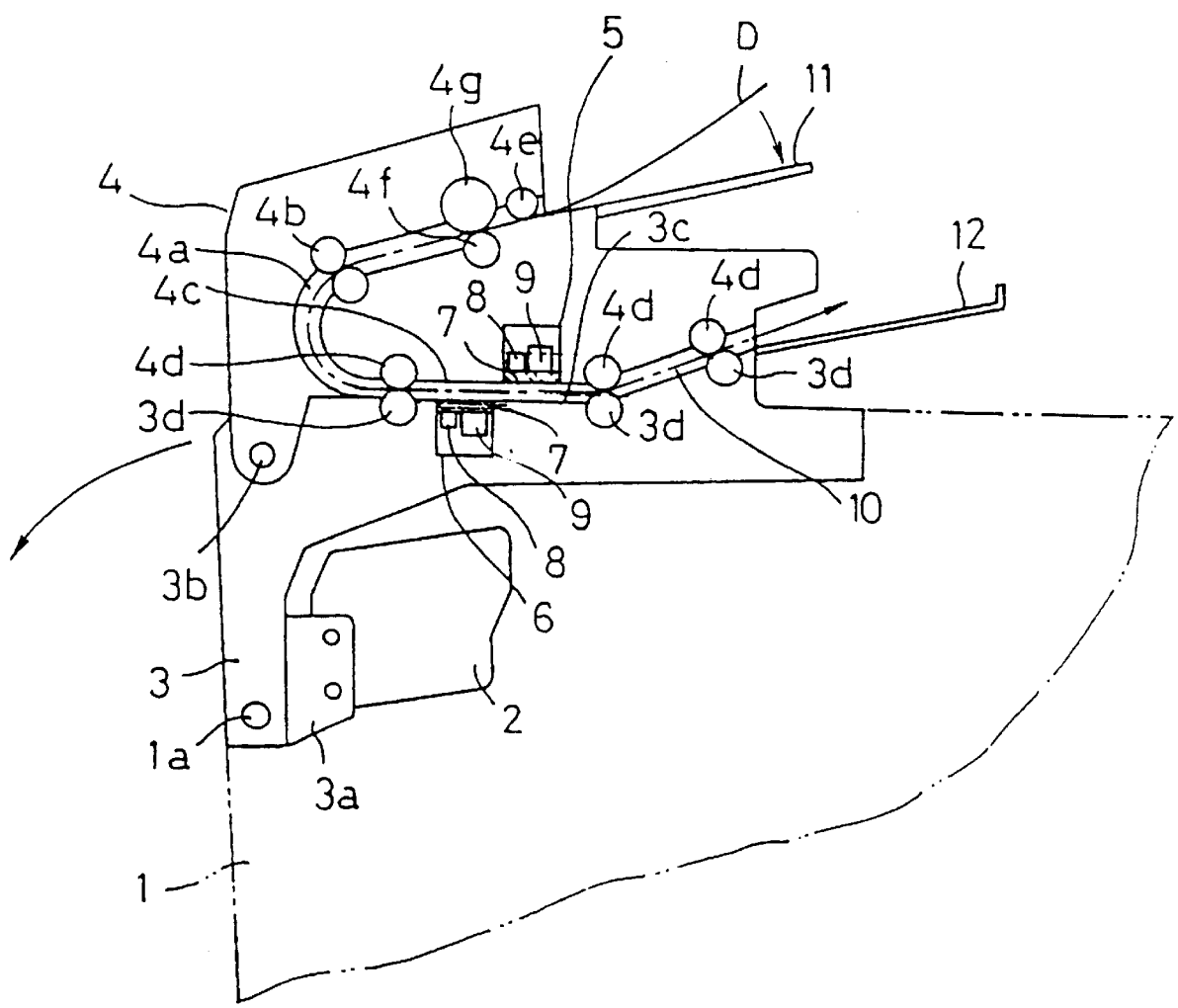
FIG. 1 is a fragmentary view showing an image forming apparatus embodying the present invention.

Referring to FIG. 1 of the drawings, an image forming apparatus embodying the present invention is shown and includes a body 1 for forming a toner image on a sheet by a conventional electrophotographic process. A fixing unit 2 fixes the toner image formed on the sheet 1. A scanner support 3 is connected to the apparatus body 1 by a shaft 1a. The scanner support 3 is rotatable about the shaft 1a between an operative or closed position contacting the apparatus body 1a and an inoperative or open position uncovering the inside of the apparatus body 1. A stay 3a protrudes from the scanner support 3 into the apparatus body 1 and carries the fixing unit 2 thereon. When the scanner support 3 is held in its closed position, as shown in FIG. 1, the fixing unit 2 is located in its preselected position for fixing the toner image on the sheet.

An ADF or automatic document conveying unit 4 is connected to the scanner support 3 by a shaft 3b in such a manner as to be rotatable between an operative position shown in FIG. 1 an inoperative or open position. A turn-over path 4a is formed in the ADF unit 4 while a plurality of conveyor roller pairs 4b are arranged along the turn-over path 4a. An upper guide surface 4c forms the bottom of the ADF unit 4. A plurality of conveyor rollers 4d are arranged along the upper guide surface 4c. A first and a second reading section 5 and 6 are mounted on the ADF unit 4 and scanner support 3, respectively. The reading sections 5 and 6 each includes a glass platen 7, a light source 8 for illuminating a document D, and a contact image sensor 9 for reading a reflection from the document D with 1:1 optics.

A lower guide surface 3c is provided on the top of the scanner support 3. When the ADF unit 4 is held in the operative position shown in FIG. 1, the lower guide surface 3c cooperates with the upper guide surface 4c to form a transport path 4a contiguous with the turn-over path 10. A plurality of conveyor rollers 3d are arranged along the lower guide surface 3c and contact, in the above condition, the conveyor rollers 4d, constituting roller pairs.

The first reading section 5 is mounted on the ADF unit 4 such that the bottom or contact surface of its glass platen 7 is flush with the upper guide surface 4c. The contact image sensor 9 and light source 8 face the transport path 10 via the glass platen 7. Likewise, the second reading section 6 is mounted on the scanner support 3 such that the top or contact surface of its glass platen 7 is flush with the lower guide surface 3c; the contact image sensor 9 and light source 8 face the path 10 via the glass platen 7.

The document D is laid on a tray or document stacking section 11 face down. A pick-up roller 4e, a conveyor roller 4f and a reverse roller 4g feed the document to the turn-over path 4a in cooperation. The conveyor roller pairs 4b convey the document D along the turn-over path 4a. The document D transferred from the turn-over path 4a to the transport path 10 is conveyed by the conveyor rollers 3d and 4d. While the document D is conveyed at a preselected reading speed, the first reading section 5 causes the light source 8 to illuminate the front of the document D and causes the image sensor 8 to receive the resulting reflection from the document D. In response, the image sensor or stationary optics 9 transforms the incident reflection to a corresponding electric scan signal. Assume that the document D is two-sided, i.e., carries images on both sides thereof, and that the apparatus is so set as to read both sides of the document D beforehand. Then, the second reading section 6 causes its light source 8 to illuminate the other side or rear of the document D being conveyed at the preselected speed. The image sensor 9 of the second reading section 6 transforms the resulting reflection from the rear of the document D to a corresponding electric scan signal. The document D moved away from the reading sections 5 and 6 is driven out to another tray 12 by the conveyor rollers 3d and 4d.

When only the front of the document D is read, the scan signal is output time-serially from the contact image sensor 9 of the reading section 5. When both sides of the document D are read, the scan signals are respectively output time-serially from the image sensors 9 of the two reading sections 5 and 6. A controller, not shown, converts such a scan signal to an image signal. The apparatus body 1 forms an image on a sheet on the basis of, e.g., the image signal and control signals received from the controller.

In the illustrative embodiment, the document D is laid on the tray 11 face down, i.e., with its front facing downward. Alternatively, the document D may, of course, be laid on the tray 11 face up, i.e., with its front facing upward. In such a case, the first and second reading sections 5 and 6 will respectively read the rear and the front of the document D with their image sensors 9.

Figure 2:
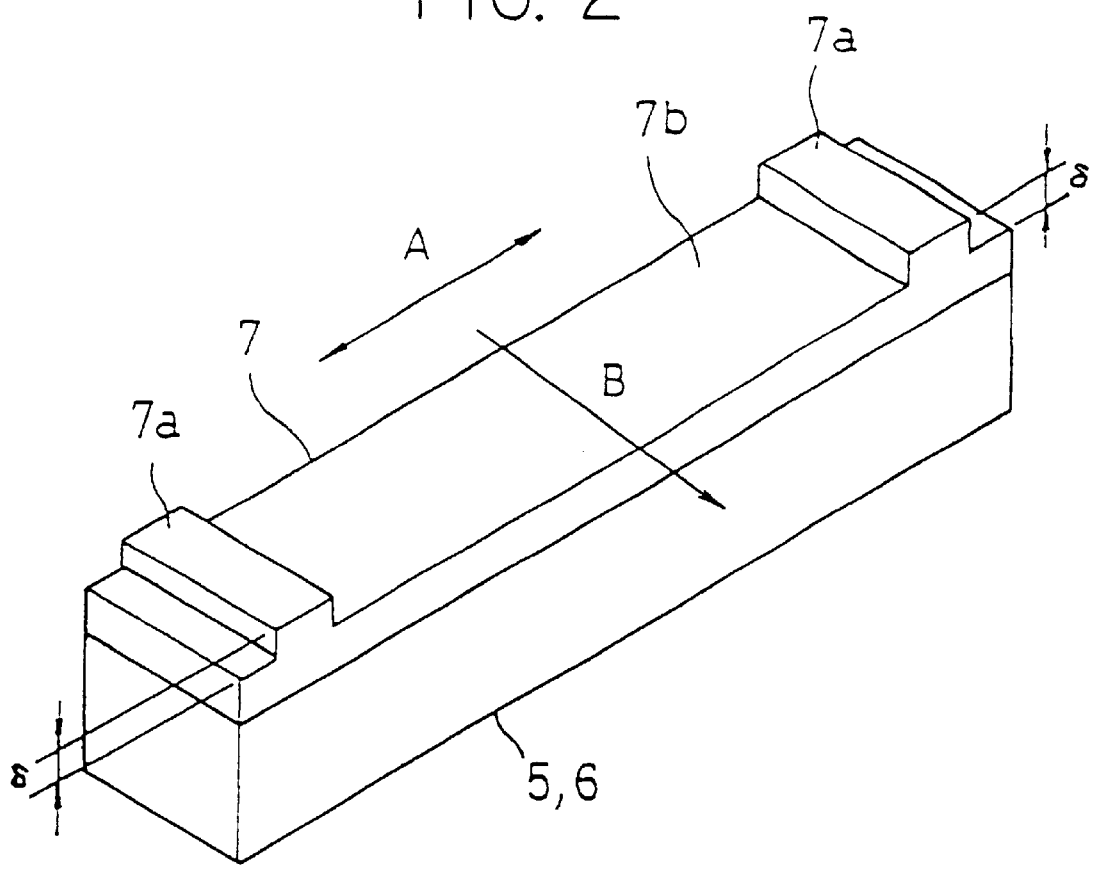
FIG. 2 is an external perspective view showing a reading section included in the embodiment specifically.
Figure 3:
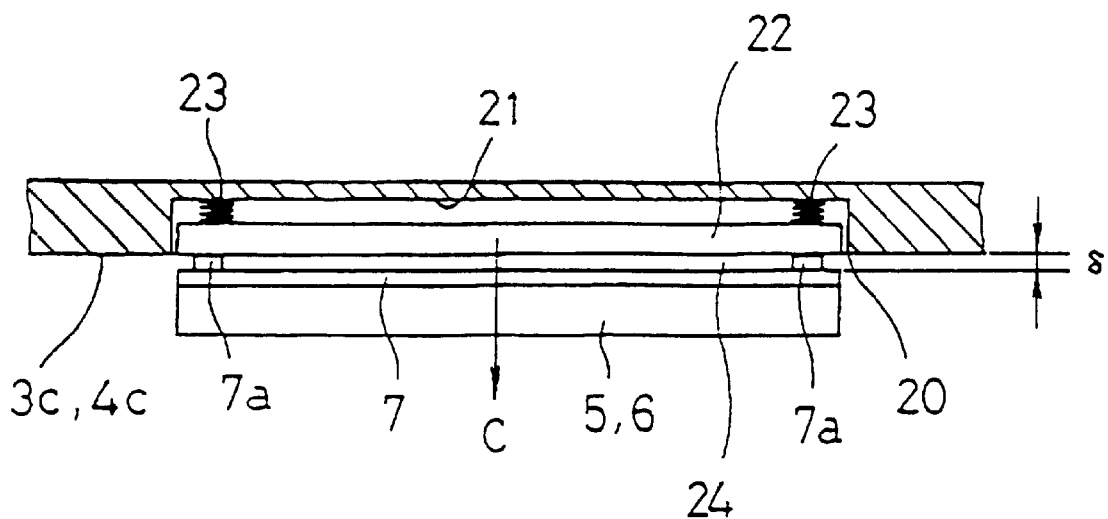
FIG. 3 shows a specific configuration of a pressing mechanism also included in the embodiment and located at a reading position on an upper or a lower guide surface.

FIG. 2 shows a specific configuration of one of the two reading sections 5 and 6. FIG. 3 shows a specific configuration of a pressing mechanism located at each of the two reading positions defined on the upper and lower guide surfaces. As shown in FIG. 2, the glass platen 7. is implemented as a single molding having stepped portions 7a at both sides thereof with respect to the widthwise direction of the document D (arrow A). Each stepped portion 7a has a height $\delta$, as measured from a contact surface 7b, and is elongate in the document transport direction (arrow D) at the respective side of the glass platen 7. As shown in FIG. 3, a pressing mechanism 20 is provided on the upper guide surface 3c or lower guide surface 4c such that it faces the reading section 5 or 6. The pressing mechanism 20 has a presser plate 22 and compression springs 23 received in a recess 21 formed in the guide surface 3c or 4c.

The springs 23 constantly bias the presser plate 23 in the direction indicated by an arrow C in FIG. 3, so that the presser plate 22 usually remains in pressing contact with the upper surfaces of the stepped portions 7a. In this condition, a passage 24 having the height $\delta$ is available between the contact surface 7b and the presser plate 22 for the document D to be passed while being read by the reading section 5 or 6. The stepped portions 7a molded integrally with the glass platen 7 and forming the passage 24 is advantageous over spacer members, not shown, identical in configuration with the stepped portions 7a, but adhered to the glass platen 7 for the following reason. The spacer members would aggravate irregularity in the height δ of the passage 24 due to the dimensional errors of the spacer members and irregularity in the thickness of adhesive layers between the spacer members and the glass platen 7. Therefore, the stepped portions 7a of the glass platen 7 reduce the fluctuation in the length of the optical path between the contact image sensor 9 and the front or the rear of the document D to be read. This allows the image sensor 9 to read the document D without any blurring.

As stated above, the first reading section 5 is mounted on the ADF unit 4 in order to promote the efficient use of the space available in the ADF unit 4. Because the scanner support 3 supports the fixing unit 2 within the apparatus body 1, the space available in the apparatus body 1 is also efficiently used. These in combination reduce the overall dimensions of the apparatus, e.g., facsimile apparatus including the two reading sections 5 and 6, ADF unit 4, and fixing unit 2.

Figure 4A:
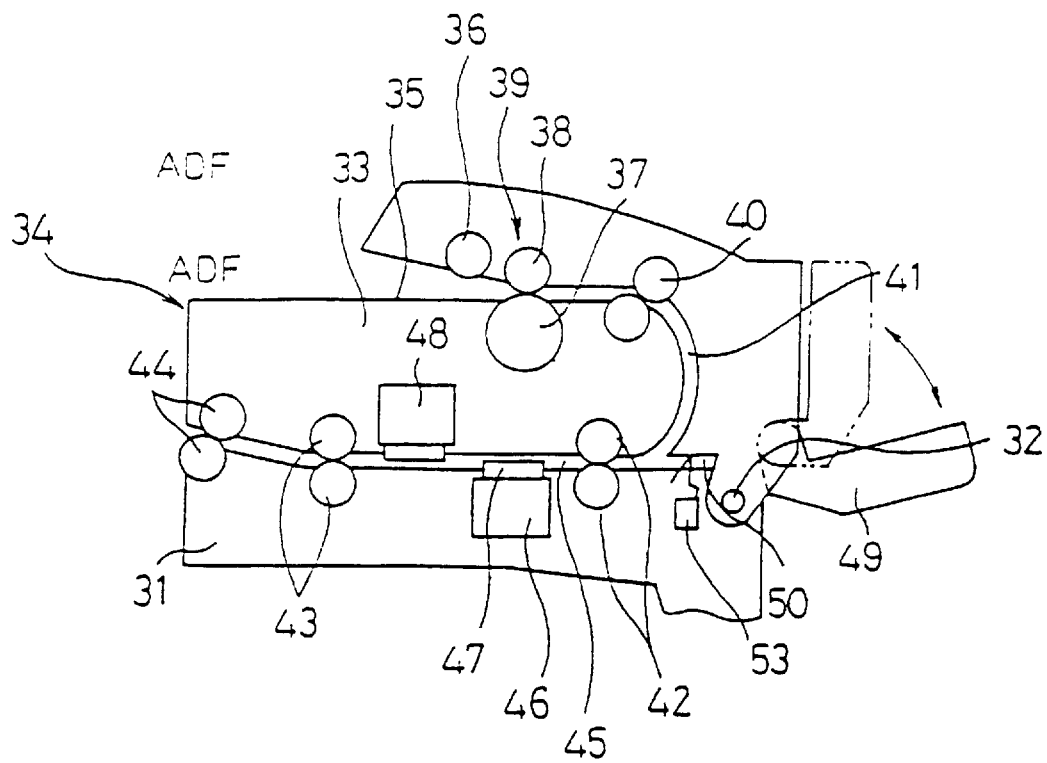
FIGS. 4A and 4B show a document reading device also embodying the present invention.
Figure 4B:
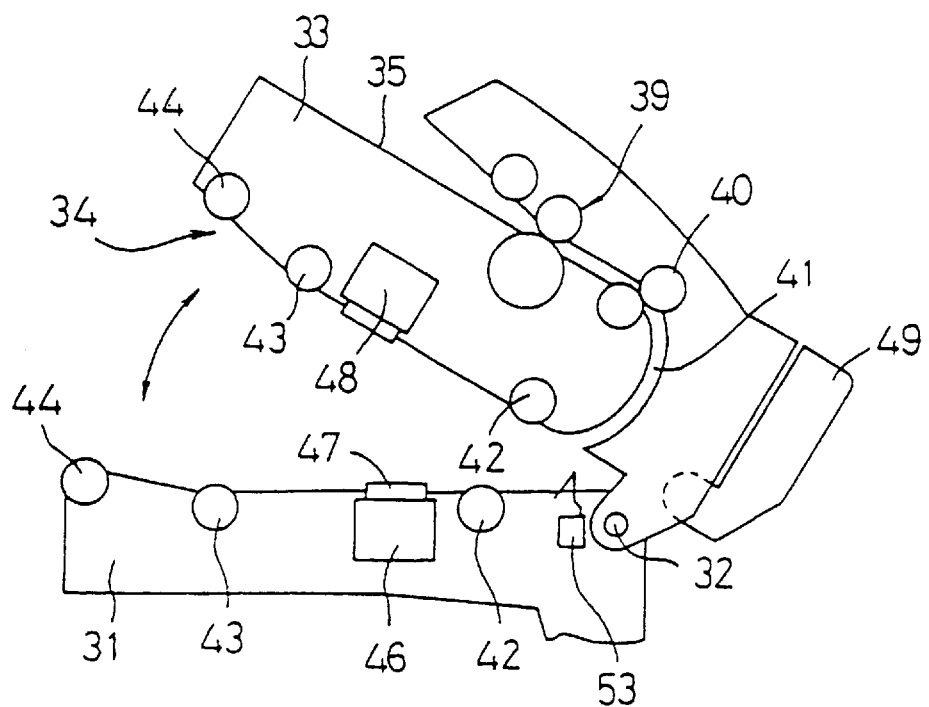

Referring to FIG. 4A and 4B, a document reading device also embodying the present invention will be described. As shown, the document reading device is applied to a facsimile apparatus and generally made up of a scanner unit 31 and an ADF unit 33. The scanner unit 31 is mounted on the scanner unit 31 via a shaft 32 and is openable about the shaft 32, as needed. The ADF unit 33 cooperates with the top of the scanner unit 31 to constitute a turn-over type sheet-through ADF 34. The ADF 34 includes a tray 35 to be loaded with a stack of documents, not shown. A pick-up roller 36, a conveyor roller 37 and a reverse roller 38 constitute a sheet separating and feeding section 39. The conveyor roller 37 and reverse roller 38 are provided in a pair. The above section 39 separates the uppermost document from the underlying documents on the tray 35, and feeds it from the tray 35. A generally U-shaped turn-over path 41 includes a pair of conveyor rollers 40. The turn-over path 41 merges into a substantially horizontal linear transport path 45 including conveyor roller pairs 42 and 43 and a discharge roller pair 44. In this manner, the transport path 45 is formed between the surfaces of the scanner unit 31 and ADF unit 33 facing each other. When the ADF unit 33 is opened, it uncovers the transport path 45, as shown in FIG. 4B. A reading section 46 is mounted on the scanner unit 31 and has a contact image sensor, not shown, facing the transport path 45 between the conveyor rollers 42 and 43. The reading section 46 includes a glass platen 47. The contact image sensor plays the role of a so-called sheet scanner; the position where the image sensor is located is the reading position.

A reading section 48 is mounted on the ADF unit 33 downstream of the above reading section 46 in the direction of document transport. The reading section 48 is an auxiliary reading section or a reading section for reading the rear of a document, and also includes a contact image sensor. Sensing means for sensing the size of the sheet to be fed from the tray 35 is built in the ADF unit 33.

Figure 5:
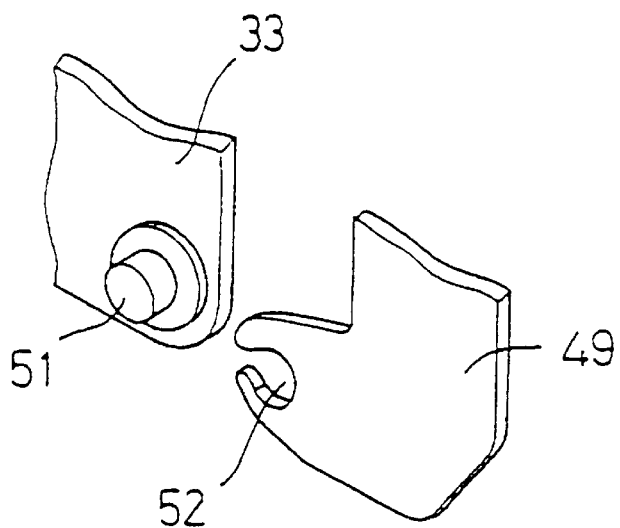
FIG. 5 is an exploded perspective view showing a mechanism included in the device of FIGS. 4A and 4B for mounting and dismounting a manual feed unit.

A manual feed unit 49 is mounted on the ADF unit 33 in the vicinity of the shaft 32. The manual feed unit 49 forms an insertion path 50 linearly merging into the transport path 45 at the upstream side of the path 45. As shown in FIG. 5, bosses 51 (only one is shown) are formed on both sides of the ADF unit 33. The manual feed unit 49 is rotatable about the bosses 51 by about 90 degrees between a closed position and an open position thereof. The manual feed unit 49 is formed with engaging portions 52 (only one is shown) respectively engaged with the bosses 51. Each engaging portion has its open portion so restricted as to be prevented from easily slipping out of the boss 51, but removable from the boss 51.

Figure 6:
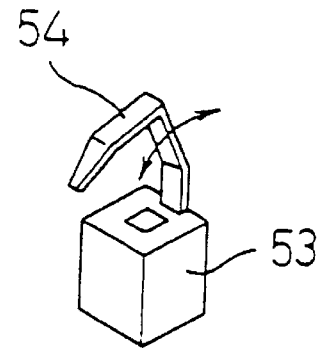
FIG. 6 is an external perspective view of a document sensor included in the device of FIGS. 4A and 4B.
Figure 7:
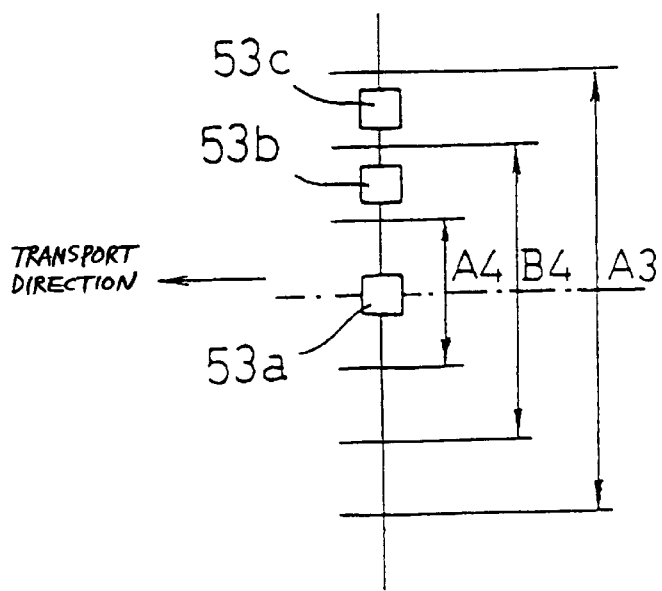
FIG. 7 shows a specific arrangement of a plurality of document sensors applicable to the device of FIGS. 4A and 4B.

A document sensor 53 is mounted on the scanner unit 31 and disposed in the insertion path 50. As shown in FIG. 6 specifically, the document sensor 53 has an actuator 54 to be moved by a document inserted by hand, and is turned on and turned off thereby. In the illustrative embodiment, as shown in FIG. 7, the document sensor 53 is implemented as three document sensors 53a, 53b and 53c each being responsive to a particular document or sheet size in the widthwise direction perpendicular to the direction of document transport. In the specific arrangement shown in FIG. 7, the document sensor 53a is located at the center in the widthwise direction. The document sensor 53b is located outside of the width of size A4, but inside of the width of size B4. The document sensor 53c is located outside of the width of size B4, but inside of size A3. When a document is inserted into the manual feed unit 49 with its center used as a reference, the document sensor 53a senses it. If only the sensor 53a is turned on, the document is determined to be of size A4. When the sensors 53a and 53b are turned on, the document is determined to be of size B4. Further, when all the sensors 53a–53c are turned on, the document is determined to be of size A3.

Usually, the manual feed unit 49 is held in its closed position or raised position, as indicated by a phantom line in FIG. 4A. When documents of usual thickness and size are to be read by the facsimile apparatus, they are stacked on the tray 35 face up. When the reading operation begins, the document separating and feeding section 39 sequentially feeds the document into the turn-over path 41, the uppermost document first. The document fed by the above section 39 is driven into the transport path 45 via the conveyor roller pair 42, while being turned over by the turn-over path 41. While the conveyor roller pair 42 and the following conveyor roller pair 43d rive the document stably at a preselected speed, the contact image sensor of the reading section 46 sequentially reads the image of the document, one line at a time. The resulting image information is suitably processed by conventional means and then sent to a remote station. At the same time, information representative of the document size is also generated and sent to the remote station, so that the remote station can receive the image data with an adequate size. The discharge roller pair 44 drives the document read by the image sensor to the outside. Such a procedure is repeated with the consecutive documents.

On the other hand, a document which is 0.4 mm thick or above or 1,200 mm long or above cannot be automatically fed from the tray 35 because the turn-over path 41 is not suitable for such a kind of document. In this case, the manual feed unit 49 is opened or lowered away from the ADF unit 33, as indicated by a solid line in FIG. 4A. As a result, the insertion path 50 is uncovered. The document is held by hand face down and then inserted into the insertion path 50 via the manual feed unit 49 until its leading edge has been gripped by the conveyor roller pair 42. When the document sensor 53a senses the leading edge of the document, the conveyor roller 42 as well as other constituents is rendered operable. The size of the document (width) is determined on the basis of the outputs of the document sensors 53a–53c (ON or OFF), so that the remote station can receive image data with an adequate size. After the roller pair 42 has gripped the document and started driving it in the transport path 45, it is sequentially read line by line by the contact image sensor of the reading section 46. Subsequently, the document is driven out by the discharge roller pair 44. This is also true with other documents, if any. In this manner, even a relatively thick or a relatively long document can be fed linearly via the manual feed unit 49 and insertion path 50 without being routed through a curved path. Therefore, the reading section 46 is capable of reading any desired kind of document.

Figure 8:
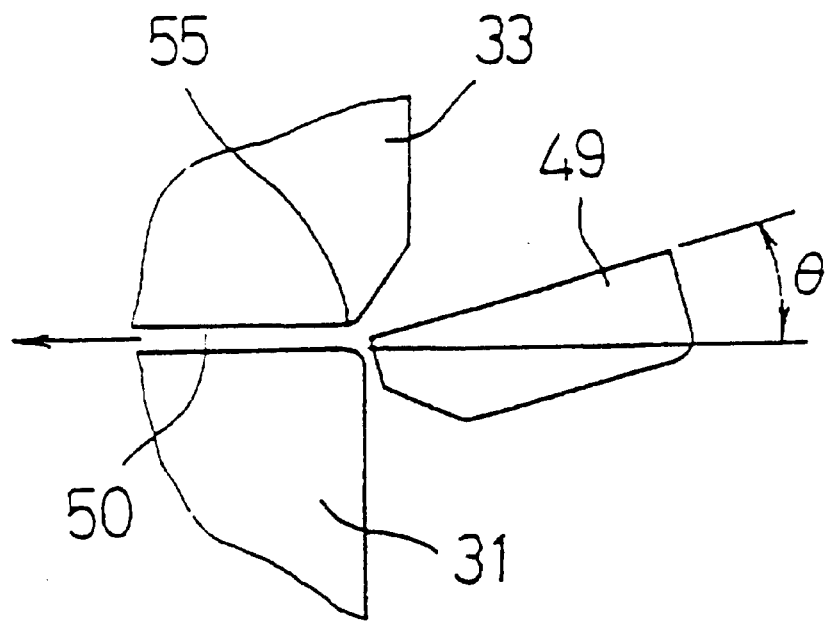
FIG. 8 is a view for describing the inclination of a manual feed unit also included in the device of FIGS. 4A and 4B.
Figure 9:
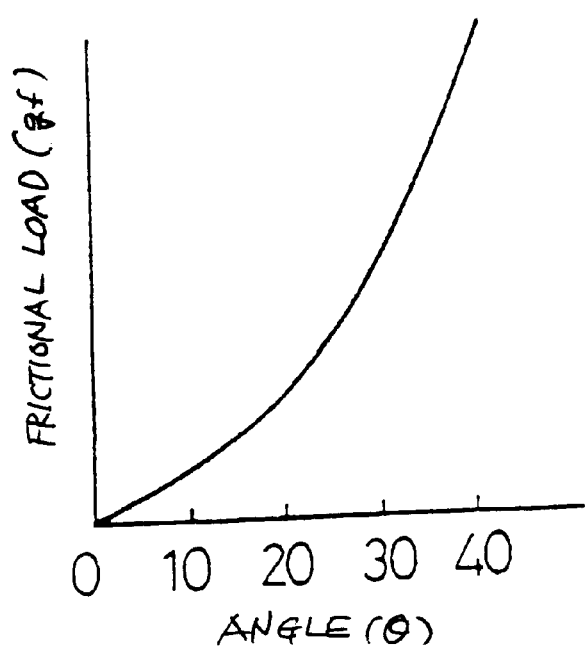
FIG. 9 is a graph showing a relation between the inclination of the manual feed unit and the frictional load.

Hereinafter will be discussed the inclination of the insertion path 50 formed by the manual feed unit 49. When a relatively thick document, for example, is inserted into the insertion path 45 via the manual feed unit 49, it is preferable that the path extending from the unit 49 merges linearly into the transport path 45. However, such a path may be slightly inclined, as follows. Assume that the path formed by the manual feed unit 49 is inclined by an angle 6, as shown in FIG. 8. As the angle θ increases, the frictional load ascribable to the document abutting against the inlet portion 55 of the insertion path 50 increases, as shown in FIG. 9 specifically. Should the frictional load be excessive, it would cause, e.g., the conveyor roller 42 to slip during conveyance and would result in various troubles. The troubles include the extension of an image when the document is read by the image sensor, and the failure of synchronization of a motor for driving the rollers. Therefore, the angle θ should preferably be confined in a range in which the frictional load is light, e.g., 15 degrees or less.

While the above embodiment has concentrated on a contact image sensor, it is similarly practicable with optics of the type having a light source, a reduction type focusing system, and a CCD (Charge Coupled Device) image sensor. Further, in the embodiment, the apparatus body is implemented as the ADF unit 33, and the manual feed unit 49 is removably and openably mounted to the unit ADF unit 33. If desired, the scanner unit 31 may be constructed as an apparatus body and provided with the manual feed unit 49 thereon in the removable and openable configuration.

In summary, it will be seen that the present invention has various unprecedented advantages as enumerated below.

(1) A space available in an ADF unit and a space available in an apparatus body are efficiently usable. Therefore, an image forming apparatus including two reading sections capable of reading both sides of a document, a document transport unit and a fixing unit can have its overall dimensions reduced.

(2) When the ADF unit is opened away from its operative position, an upper guide surface and a lower guide surface are uncovered. In this condition, the operator can remove a document jamming a transport path easily or clean or otherwise maintain, e.g., glass platens included in the two reading sections.

(3) Stepped portions are molded integrally with the glass platen of each reading section at opposite sides of the glass platen. The stepped portions form a passage for a document by contacting the upper guide surface or the lower guide surface. Such stepped portions are advantageous over spacer members identical in configuration with the stepped portions, but adhered to the glass platen. The spacer members would aggravate irregularity in the height of the passage due to the dimensional errors of the spacer members and irregularity in the thickness of adhesive layers between the spacer members and the glass platen. Therefore, the stepped portions reduce fluctuation in the length of the optical path between stationary reading optics and the surface of the document to be read. This allows the stationary reading optics to read the document without any blurring.

(4) A turn-over type sheet-through ADF has thereinside a turn-over path and a transport path contiguous with the turn-over path. A manual feed unit has an insertion path directly merging into the upstream end of the transport path of the ADF from the outside. It follows that relatively thick or long documents not suitable for the turn-over path can be directly inserted into the transport path via the insertion path one by one. This allows the optics to read any kind of document.

(5) Because the manual feed unit is removably mounted to the apparatus body, it can be held in its closed position when not used. This saves the space to be occupied by the ADF. In addition, the manual feed unit can be implemented as an optional unit for users not needing the manual feeding function.

(6) Document sensors are provided for determining whether or not a document is present on the insertion path, and the size of a document present on the insertion path. This allows the operation for reading a manually inserted document to start at an adequate timing. In addition, the document size sensed beforehand allows, when the present invention is applied to a facsimile apparatus, a receiving facsimile station to receive image data with an adequate size.

(7) The insertion path merges into the transport path linearly at an angle capable of obviating an excessive frictional load. Therefore, when the reading section reads the document fed by hand, there can be eliminated the extension of an image ascribable to the slippage of rollers and the failure of synchronization of a drive motor.

Various modifications will become possible for those skilled in the art after receiving the teachings of the present disclosure without departing from the scope thereof.

What is claimed is:

1. A document reading device comprising:
    a turn-over type sheet-through ADF including a document separating and feeding section for feeding a document while separating said document from other documents, a generally U-shaped turn-over path for turning over the document, and a transport path along which said document turned over by said turn-over path is conveyed, said transport path including a reading position assigned to stationary optics; and
    a manual feed unit forming an insertion path directly merging into an upstream side of said transport path following said turn-over path from outside of said device,
    wherein when the manual feed unit is in an open position, the manual feed unit forms an inclined angle with respect to transport path such that the insertion path merges into the transport path linearly at an inclined angle.

2. A device as claimed in claim 1, wherein said manual feed unit is openably and removably mounted to an apparatus body.

3. A device as claimed in claim 1, further comprising a document sensor for determining whether or not the document is present in said insertion path, and a size of the document.

4. A device as claimed in claim 1, wherein said reading position includes a first reading position assigned to stationary optics for reading a first surface of the conveyed document and a second reading position assigned to stationary optics for reading a second surface of the conveyed document, said second surface being opposite to said first surface.

5. A device as claimed in claim 4, wherein said first surface is a front surface of said document and said second surface is a rear surface of said document.

6. A device as claimed in claim 4, wherein said first surface is a rear surface of said document and said second surface is a front surface of said document.

7. A document reading device comprising:

a turn-over type sheet-through ADF including a document separating and feeding section for feeding a document while separating said document from other documents, a generally U-shaped turn-over path for turning over the document, and a transport path along which said document turned over by said turn-over path is conveyed, said transport path including a reading position assigned to stationary optics; and a manual feed unit forming an insertion path directly merging into an upstream side of said transport path following said turn-over path from outside of said device, wherein said insertion path merges into said transport path linearly at an inclined angle at which a frictional load is light, and wherein said manual feed unit is openably and removably mounted to an apparatus body.

8. A device as claimed in claim 7, further comprising a document sensor for determining whether or not the document is present in the insertion path, and a size of the document.

9. A device as claimed in claim 7, wherein said reading position includes a first reading position assigned to stationary optics for reading a first surface of the conveyed document and a second reading position assigned to stationary optics for reading a second surface of the conveyed document, said second surface being opposite to said first surface.

10. A device as claimed in claim 9, wherein said first surface is a front surface of said document and said second surface is a rear surface of said document.

11. A device as claimed in claim 9, wherein said first surface is a rear surface of said document and said second surface is a front surface of said document.

* * * * *